United States Patent [19]

Rhee

[11] 3,794,934

[45] Feb. 26, 1974

[54] NON-SATURATING OSCILLATOR AND MODULATOR CIRCUIT

[75] Inventor: Dong Woo Rhee, Williamsville, N.Y.

[73] Assignee: GTE Sylvania Incorporated, Seneca Falls, N.Y.

[22] Filed: Nov. 2, 1972

[21] Appl. No.: 303,227

Related U.S. Application Data

[63] Continuation-in-part of Ser. No. 225,856, Feb. 14, 1972, abandoned.

[52] U.S. Cl. .............. 332/16 T, 178/7.7, 330/30 D, 331/108 C, 331/111, 307/268

[51] Int. Cl. ......................... H03c 3/00, H03b 15/12

[58] Field of Search..........332/16 R, 16 T; 331/111, 331/108 C, 108 D; 330/30 D, 69; 307/268; 178/7.7

[56] References Cited

UNITED STATES PATENTS

| | | | |
|---|---|---|---|
| 3,610,955 | 10/1971 | Blaser et al. | 330/30 D |
| 3,156,875 | 11/1964 | Fiorino et al. | 331/111 |
| 3,170,125 | 2/1965 | Thompson | 332/16 T |
| 3,371,269 | 2/1968 | Wattson | 330/69 X |
| 3,550,040 | 12/1970 | Sinusas | 330/30 D X |
| 3,646,477 | 2/1972 | Goodall | 332/16 T X |

*Primary Examiner*—Alfred L. Brody
*Attorney, Agent, or Firm*—Norman J. O'Malley; Thomas H. Buffton; Cyril A. Krenzer

[57] ABSTRACT

A non-saturating oscillator and modulator circuit includes a charging circuit coupled to a potential source and potential reference level, first and second electron devices coupled to the potential source and by a third electron device to the potential reference level with the first electron device coupled to the charging circuit and by way of a fourth electron device to a first bias potential circuit. Fifth and sixth electron devices are coupled to the potential reference level with the fifth electron device coupled to the first bias circuit and potential source and the sixth electron device coupled to a second bias potential circuit and to the charging circuit.

26 Claims, 7 Drawing Figures

NON-SATURATING OSCILLATOR AND MODULATOR CIRCUIT

CROSS-REFERENCE TO RELATED APPLICATION

This application is a continuation-in-part of U.S. application Ser. No. 225,856, filed Feb. 14, 1972, now abandoned, entitled "Non-Saturating Oscillator and Modulator Circuit," assigned to the assignee of the present application, and filed in the name of Dong Woo Rhee, the inventor of the present application.

BACKGROUND OF THE PRESENT INVENTION

The prior art suggests numerous forms of oscillator and modulator circuitry. Also, so-called multivibrator and unijunction oscillator type circuitry are presently popular for horizontal and vertical scan systems in TV receivers.

Further, the advent of integrated circuitry construction has initiated an increase in the popularity of the multivibrator circuit because of ease with which integration thereof is achieved. However, this ease of integration is undesirably accompanied by the need for an excessive number of external connections and by shifting frequency with temperature variations. Specifically, temperature changes cause a divergent shift in collector to emitter saturation and base to emitter voltages which, in turn, undesirably alters the frequency of the circuitry.

Also, unijunction oscillator circuitry is easily integrated and requires but one capacitor and few external connections. However, this desired ease of integration is undesirably accompanied by a tendency toward oscillation failure at higher and lower temperature ranges. Moreover, a single operational reference level leaves much to be desired insofar as oscillator reliability is concerned when compared with dual reference level oscillator circuitry.

OBJECTS AND SUMMARY OF THE INVENTION

Therefore, it is an object of the present invention to provide enhanced oscillator and modulator circuitry. Another object of the invention is to provide an improved oscillator and modulator circuit having an integratable circuit configuration. Still another object of the invention is to provide a non-saturating oscillator circuit adapted to integrated construction. A further object of the invention is to provide oscillator circuitry having improved FM linearity and adapted to IC construction. A still further object of the invention is to provide an IC oscillator configuration having a reduced number of external connections and multiple operational reference levels. Also, it is an object of the invention to provide an oscillator circuit suitable for triggering by an input sync signal.

These and other and further objects, advantages and capabilities are achieved in one aspect of the invention by a non-saturating oscillator and modulator circuit having a potential source, a potential reference level, and a charging circuit including a charge capacitor coupled to the potential reference level with an integratable circuit including the remaining portion of the charging circuit coupling the charge capacitor to the potential source, a first differential amplifier coupled to the charging circuit and to a first bias potential means, and a second differential amplifier coupled to the charging circuit and to a second bias potential means whereby a stable oscillator or modulator circuit utilizing dual reference potential levels is provided.

PREFERRED EMBODIMENTS OF THE INVENTION

For a better understanding of the present invention, together with other and further objects, advantages and capabilities thereof, reference is made to the following disclosure and appended claims in connection with the accompanying drawings.

Figure 1:
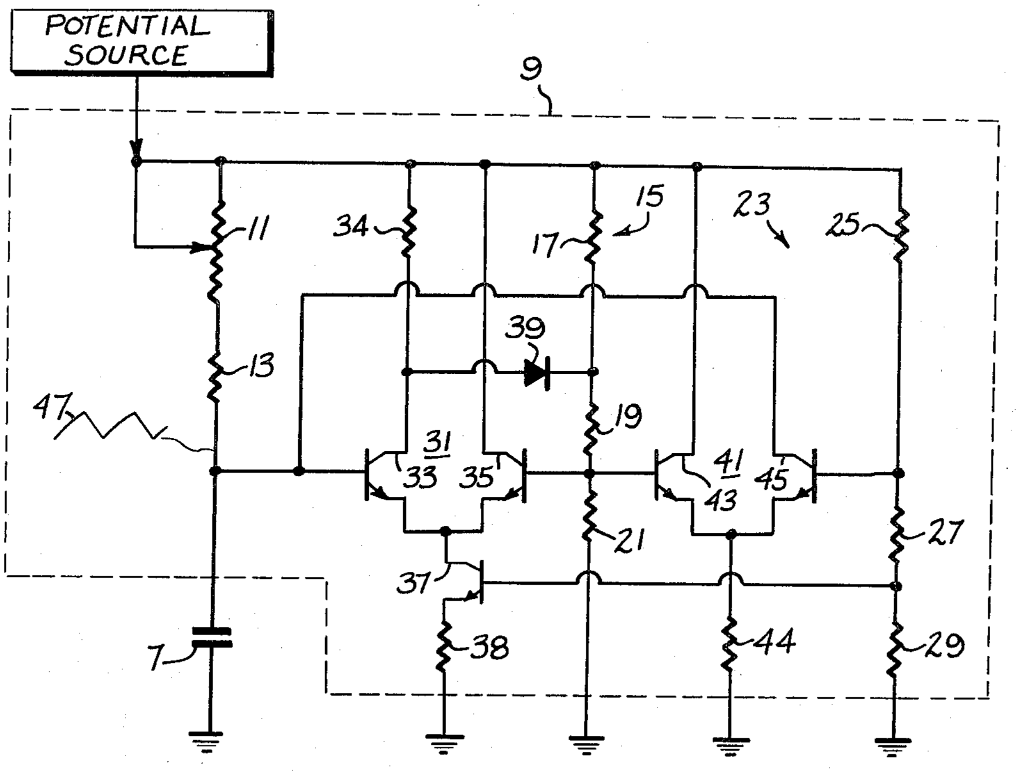
FIG. 1 is a schematic illustration of a preferred form of an integratable oscillator and modulator circuit.

Referring to the drawings, FIG. 1 illustrates a non-saturating oscillator and modulator circuit having a potential source B+, a potential reference level such as circuit ground, a charging network which includes a charging capacitor 7 coupled intermediate the potential source B+ and potential reference level, and an integratable circuit configuration 9.

The integratable circuit configuration 9 includes a charging network having an adjustable impedance 11 and fixed impedance 13 series connected to the potential source B+ and to the charging capacitor 7 coupled to circuit ground. A first bias potential circuit 15 includes resistors 17, 19, and 21 series connected intermediate the potential source B+ and potential reference level. Also, a second bias potential circuit 23 includes a plurality of resistors 25, 27, and 29 series coupling the potential source B+ to the potential reference level.

A first differential amplifier 31 includes a first electron device 33 having a control electrode coupled to the charging capacitor 7, an output electrode coupled by a resistor 34 to the potential source B+, and an input electrode coupled to a second electron device 35 and by way of a third electron device 37 and resistor 38 to the potential reference level. The second electron device 35 has an output electrode coupled to the potential source B+ and a control electrode coupled to the junction of the series connected resistors 19 and 21 of the first bias potential circuit 15. Moreover, the third electron device 37 has a control electrode coupled to the junction of the series connected resistors 27 and 29 of the second bias potential circuit 23 and a fourth electron device 39, in the form of a diode in this instance, couples the output electrode of the first electron device 33 to the junction of the series connected resistors 17 and 19 of the first bias potential circuit 15.

Also, a second differential amplifier 41 includes a fifth electron device 43 having an output electrode coupled to the potential source B+, a control electrode coupled to the junction of the series connected resistors 19 and 21 of the first bias potential circuit 15, and an input electrode coupled by a resistor 44 to the potential reference level and to an input electrode of a sixth electron device 45. Moreover, the sixth electron device 45 has a control electrode coupled to the junction of the series connected resistors 25 and 27 of the second bias potential circuit 23 and an output electrode coupled back to the charging capacitor 7 of the charging network.

As to operation, it may be assumed there is no initial charge across the charging capacitor 7 when the potential source B+ is first turned on. Thereupon, the second electron device 35 is in a conductive or turned-on condition due to the bias potential developed across the resistor 34, fourth electron device 39, and series connected resistors 17, 19, and 21 respectively of the first bias potential circuit 15. Moreover, the sixth transistor 45 is also non-conductive or turned off since the bias potential developed at the junction of the resistors 25 and 27 is lower than the potential at the junction of the resistors 19 and 21. Thus, the charging capacitor 7 of the charging network charges slowly in accordance with the time constant as determined by the charging capacitor 7 and series connected resistors 11 and 13 of the charging network.

When the potential at the charging capacitor 7 and at the control electrode of the first electron device 33 becomes higher than the bias potential at the control electrode of the second electron device 35, current flows through the first electron device 33 and resistor 34 lowering the potential at the output electrode of the first electron device 33. Also, a reduction in potential at the output electrode of the first electron device 33 reduces the current flow through the fourth electron device or diode 39 whereupon the bias potential at the control electrode of the second electron device 35 is reduced. Thus, the continued increase in charge of the charging capacitor 7 causes a continued drop in the collector electrode potential of the first electron device 33 and a continued decrease in potential at the control electrode of the second electron device 35 until the first electron device 33 is completely turned on and the second electron device 35 is completely turned off. Thus, a reference potential level, referred to as the upper reference potential level, appearing at the control electrode of the second electron device 35 effects turn-off of the second electron device 35.

Initially, the sixth electron device 45 of the second differential amplifier 41 is turned off with a bias potential at the control electrode determined by the second bias potential circuit 23 in order not to affect the charging network resistors 11 and 13 and charge capacitor 7. Also, the control electrode of the fifth electron device 43 is directly connected to the control electrode of the second electron device 35 and the first bias potential circuit 15 whereby the bias potential is determined.

As the charging capacitor 7 is increasingly charged, conduction of the first electron device 33 increases until a potential is reached at the control electrode of the second electron device 35 whereupon the second electron device 35 is turned off. At this point, the bias potential at the junction of the resistors 19 and 21 of the first bias potential circuit 15 is slightly lower than the bias potential at the junction of the resistors 25 and 27 of the second bias potential circuit 23. Therefore, the fifth electron device 43 is also turned off and the sixth electron device 45 conducts. Thus, the sixth electron device 45 and resistor 44 provide a discharge path for the charging capacitor 7, as well as for the charging current of the resistors 11 and 13. This current of the discharge path, through the electron device 45, must be greater than the charge current and can be determined by the second bias potential circuit 23 and the resistor 44. As a result, a substantially saw-tooth-shaped potential 47 appears at the charging capacitor 7.

When the charge capacitor 7 discharges through the sixth electron device 45, the second and fifth electron devices 35 and 43 are non-conductive since the potential at the junction of resistors 19 and 21 is lower than the potential at the junction of resistors 25 and 27. As the discharge of the capacitor 7 continues, the voltage at the input electrode of the first electron device 33 decreases until the potential level of the second electron device 35 is reached. Then, current through the first electron device 33 reduces and the output potential goes to a higher level increasing the potential at the junction of the resistors 19 and 21. This continued current reduction through the first electron device 33 causes a continued increase in potential at the junction of the resistors 19 and 21 until a second reference potential level, known as the lower reference potential level, is attained.

Further, discharge of the capacitor 7 through the sixth electron device 45 turns off the first electron device 33 increasing the potential at the junction of the resistors 19 and 21 to a value determined by the resistors 34, 17, 19, and 21. This increased potential at the junction of the resistors 19 and 21 turns on the second and fifth electron devices 35 and 43 again and turns off the sixth electron device 45 interrupting the discharge path of the capacitor 7. Thereupon, the capacitor 7 again starts to charge through the resistors 11 and 13 and the charge-discharge cycle is repeated.

Also, the third electron device 37 provides a constant current path for the first and second electron devices 33 and 35. Of course, this current is dependent upon the electron device 37 and associated resistor 38 as well as the bias potential provided at the junction of the resistors 27 and 29 of the second bias potential circuit 23.

Thus, the charge capacitor 7 charges up, by way of the resistors 11 and 13, to a potential providing an upper reference potential at the junction of the resistors 19 and 21 and discharges through the sixth electron device 45 to a potential providing a lower reference potential at the junction of the resistors 19 and 21. Therefore, the amplitude of the above-mentioned saw-tooth-shaped potential 47 is determined by the difference between the upper and lower reference potentials appearing at the junction of the resistors 19 and 21. The frequency of the oscillator is dependent upon the charge capacitor 7, the potential difference between the upper and lower reference potentials, the potential source B+, the charging network resistors 11 and 13, and the discharge current flow through the sixth electron device 45. Moreover, the potential appearing at the junction of the resistors 25 and 27 of the second bias potential circuit 23 is preferably between the upper and lower reference potentials appearing at the junction of the resistors 19 and 21 and substantially lower than the upper reference potential but slightly higher than the lower reference potential.

Figures 3, 6:
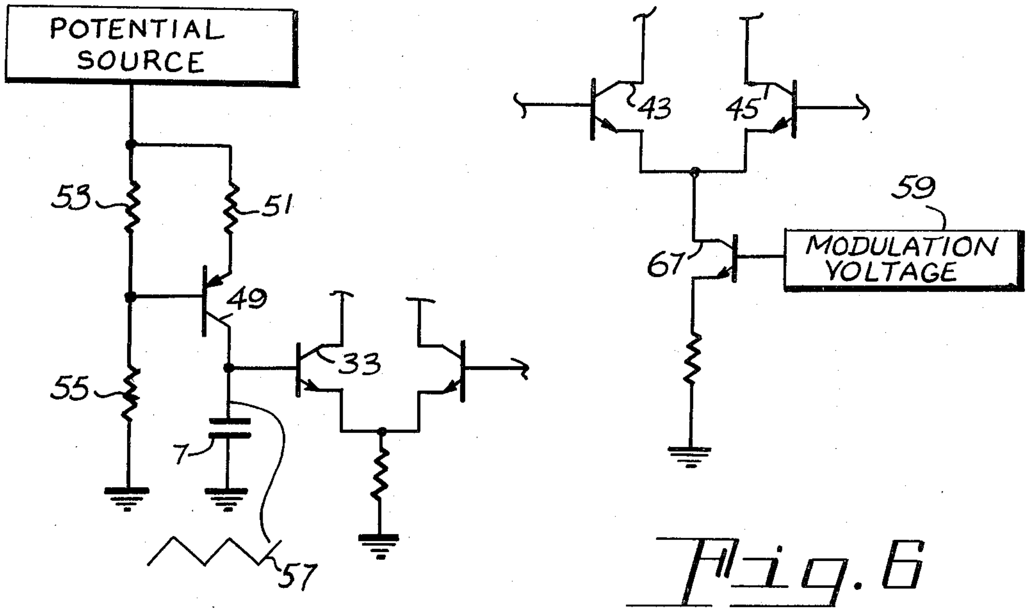
FIG. 3 is a schematic illustration of a form of integratable oscillator circuitry.
FIG. 6 is an alternative form of frequency modulation circuitry for the apparatus of FIG. 1.

Alternatively, FIG. 3 illustrates a charging network which includes a charging capacitor 7 coupled to a potential reference level and to a potential source B+ by way of a series connected seventh electron device 49 and impedance 51. A pair of series connected resistors 53 and 55 have a junction coupled to the seventh electron device 49 and are coupled to the potential source B+ and potential reference level. Moreover, the charging capacitor 7 is directly coupled to the first electron device 33.

In this instance, the seventh electron device 49, impedance 51, and series connected resistors 53 and 55 serve as a constant current source. Thus, a substantially sawtooth-shaped potential 57 appearing at the charging capacitor 7 has a desired linear charge rate as compared with the non-linear RC charging time of the sawtooth-shaped waveform 47 illustrated in FIG. 1.

Figure 2:
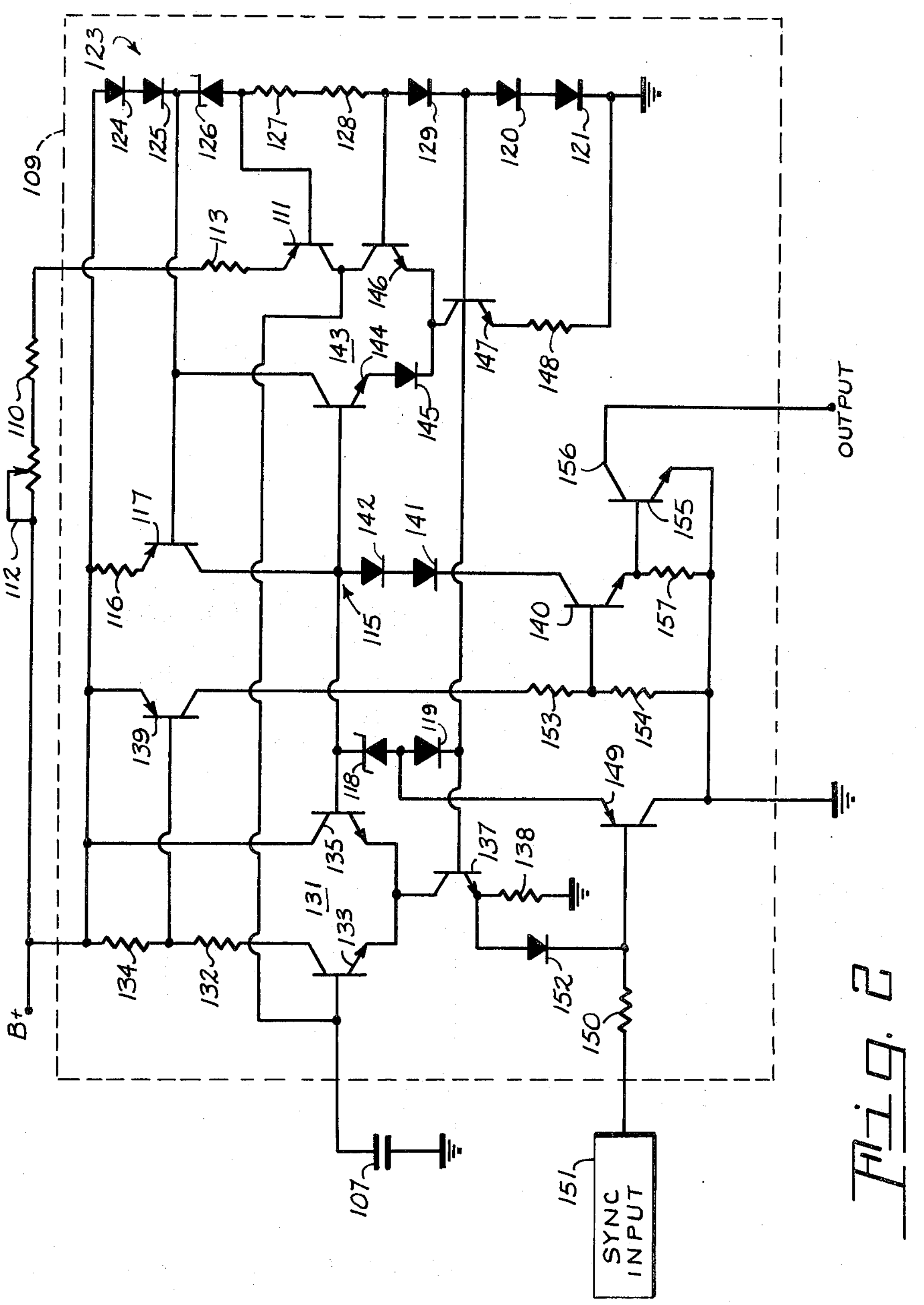
FIG. 2 illustrates a modification of the illustration of FIG. 1 for effecting improved linearity.

In a substantially similar structure illustrated in FIG. 2 an oscillator circuit includes a potential source B+, a potential reference level such as circuit ground, a charging network which includes a charging capacitor 107 coupled intermediate the potential source B+ and potential reference level, via an integratable circuit configuration 109.

The integratable circuit configuration 109 includes a charging network having a transistor 111 and resistor 113 series connected to the charging capacitor 107 coupled to circuit ground and via a fixed resistor 110 and variable resistor 112 to the potential source B+. A first bias potential circuit 115 includes a resistor 116, transistor 117, zener diode 118, diode 119, diode 120, and diode 121 series connected intermediate the potential source B+ and potential reference level. Also, a second bias potential circuit 123 includes a diode 124, diode 125, zener diode 126, resistor 127, resistor 128, diode 129, diode 120, and diode 121 series coupling the potential source B+ to the potential reference level.

A first differential amplifier 131 includes a first electron device 133 having a control electrode coupled to the charging capacitor 107, an output electrode coupled by series connected resistors 132 and 134 to the potential source B+, and an input electrode coupled to a second electron device 135 and by way of a third electron device 137 and resistor 138 to the potential reference level. The second electron device 135 has an output electrode coupled to the potential source B+ and a control electrode coupled to the junction of the transistor 117 and zener diode 118 of the first bias potential circuit 115. The third electron device 137 has a control electrode coupled to the junction of the series connected diodes 129 and 120 of the second bias potential circuit 123. Also, the output of the first electron device 133 is coupled by a resistor 132 and transfer circuit including transistor 139, resistor 153, transistor 140, base to emitter diode of transistor 155, diode 141, and another diode 142 to the junction of the series connected transistor 117 and zener diode 118 of the first bias potential circuit 115.

A second differential amplifier 143 includes a fifth electron device 144 having an output electrode coupled via diodes 124 and 125 to the potential source B+, a control electrode coupled to the junction of a transistor 117 and zener diode 118 of the first bias potential circuit 115, and an input electrode coupled by a diode 145 to the input electrode of a sixth electron device 146 and by a transistor 147 and resistor 148 to a potential reference level. The sixth electron device 146 has a control electrode coupled to the junction of the series connected resistor 128 and diode 129 of the second bias potential circuit 123 and an output electrode directly coupled to the charging capacitor 107 of the charging network and via the series connected transistor 111, resistor 113, resistor 110, and resistor 112 to the potential source B+. The control electrode of the transistor 111 is connected to the junction of the zener diode 126 and resistor 127 of the second bias potential circuit 123.

Additionally, a vertical sync pulse control circuit includes a transistor 149 having a control electrode or base coupled via a resistor 150 to a vertical sync pulse source 151 and via a diode 152 to the transistor 137. The emitter electrode of the transistor 149 is coupled to the junction of the zener diode 118 and diode 119 of the first bias potential circuit 115 while the collector electrode is coupled to circuit ground.

Output circuitry for the oscillator circuitry includes a transistor 140 having a base coupled to the junction of a pair of resistors 153 and 154 series coupled intermediate a transistor 139 and circuit ground. The collector of the transistor 140 is coupled via the diodes 141 and 142 to the junction of the transistor 117 and zener diode 118 of the first bias potential means 115 while the emitter of the transistor 140 is coupled via a transistor 155 to an output electrode 156 and via a resistor 157 to a potential reference level.

Operation is similar to the operation of the embodiment of FIG. 1. Assuming no initial charge on the charging capacitor 107, the second electron device 135 is conducting, due to the bias of the first bias potential circuit 115, and transistor 146 is non-conducting. Thus, the charging capacitor 107 slowly charges as determined by the time constant of the charging network including the capacitor 107, transistor 111, resistor 113, resistor 110, resistor 112, and potential source B+.

When the potential of the charging capacitor 107 exceeds the bias potential, which is an upper potential reference and equal to the total potential drop across zener diode 118 and three additional diodes 119, 120 and 121, at the control electrode of the second electron device 135, the first electron device 133 starts conducting lowering the output potential thereof. This lowered output of the first electron device 133 is transferred via a transfer circuit including the transistor 139, resistors 153 and 154, transistor 140, base to emitter diode of transistor 155, and diodes 141 and 142 to the control electrode of the second electron device 135. Thus, further charging of the charging capacitor 107 causes increased conduction of the first electron device 133 and decreased potential available therefrom causing a decreased conduction of the second electron device 135 until the first electron device 133 is completely turned on and the second electron device 135 is completely turned off.

When the first electron device 133 is completely turned on and the second electron device 135 is completely turned off, the transistors 139 and 140 are in full conduction, causing the junction of the zener diode 118 and transistor 117 to be lowered to a lower potential reference level which is equal to the total potential drop across the base to emitter diode of the transistor 155, the collector to emitter saturation voltage of the transistor 140, and diodes 141 and 142.

At the same time, the sixth electron device 146 of the second differential amplifier 143 is initially non-conducting as determined by the second bias potential circuit 123 while the fifth electron device 144 is directly coupled to the second electron device 135 and conducting. As the capacitor 107 charges, conduction of the first electron device 133 increases, conduction of the second electron device 135 decreases until turn off whereat the fifth electron device 144 is also turned off and the sixth electron evice 146 turned on. Thus, the sixth electron device 146 provides a discharge path for the capacitor 107 via the transistor 147 and resistor 148 and a substantially sawtooth-shaped potential appears at the charging capacitor 107.

As the discharge of the charging capacitor 107 continues, the potential at the control electrode of the first electron device 133 decreases until the lower potential reference level at the control electrode of the second electron device 135 is reached. Thereupon, current flow through the first electron device 133 is reduced which increases the output potential turning off the transistors 139, 140, and 155 which, in turn, results in a potential increase at the junction of the zener diode 118 and transistor 117. This continued current reduction through the first electron device 133 causes a continued increase in potential at the junction of the zener diode 118 and the transistor 117 until the upper potential reference level is attained. When the first electron device 133 is completely turned off and the sixth electron device 146 is non-conducting, the charging cycle is repeated.

When the first electron device 133 is completely turned on and the second electron device 135 is completely turned off, the transistors 139 and 140 are in full conduction, causing the junction of the zener diode 118 and transistor 117 to be lowered to a lower potential reference level which is equal to the total potential drop across the base to emitter diode of the transistor 155, the collector to emitter saturation voltage of the transistor 140, and diodes 141 and 142.

Therefore, the charging capacitor 107 charges up to the upper reference potential level by way of the transistor 111, which acts as a constant current source, and discharges through the sixth electron device 146 to the lower reference potential level. Thus, the sawtooth-shaped waveform across the charge capacitor 107 has a magnitude of about the potential drop across a zener diode. Moreover, the frequency of the oscillator circuit is dependent upon the magnitude of the charge and discharge current as well as the potential difference of the upper and lower potential reference levels.

Further, synchronization of the oscillator circuitry is effected by way of the sync pulse input 151 and sync pulse transistor means 149. As previously established with respect to FIG. 1, a first bias potential circuit 115, which includes the series connected potential source B+, resistor 116, transistor 117, zener diode 118, diode 119, diode 120, and diode 121 serves to establish a bias potential or an upper potential reference level at the control electrode of the second and fifth electron devices 135 and 144. Also, the output of the first electron device 133 is coupled to the control electrode of the second and fifth electron devices 135 and 144 via resistor 132, transistor 139, resistor 153, transistor 140, diode 141, and diode 142 to provide a lower reference potential level.

As previously mentioned, the first electron device 133 remains conductive as the capacitor 107 charges until the potential at the control electrode becomes lower than the upper potential reference level at the control electrode of the second and fifth electron devices 135 and 144. Thereupon, the second and fifth electron devices 135 and 144 are turned on and the first electron device 133 is turned off.

Further, it can readily be understood that a shift in conduction from the first electron device 133 to the second electron device 135 is dependent upon the potential difference between the upper potential reference level at the control electrode of the second electron device 135 and the potential at the control electrode of the first electron device 133. Also, a reduction in the upper potential reference level at the control electrode of the second electron device 135 would be accompanied by a reduction of the potential required at the control electrode of the first electron device 133 to effect a shift in conduction. Moreover, it will be shown, with respect to FIG. 5, that a reduction in the upper potential reference level required to shift conduction of the electron devices 133 and 135 causes an increase in the oscillator frequency.

In operation, the reference potential at the control electrode of the second electron device 135 may be characterized as substantially equal to the potential developed across the series connected zener diode 118, diode 119, diode 120, and diode 121. Upon receipt of a negative-going pulse signal from the sync pulse source 151, the sync pulse transistor 149 becomes conductive. Thereupon, the upper potential reference level at the control electrode of the second electron device 135 may be characterized as substantially equal to the potential drop across the zener diode 118 and the base to emitter diode of the sync pulse transistor 149 since the base of the sync pulse transistor 149 cannot go below circuit ground potential due to the clamping action of the diode 152. In essence, the upper potential reference level appearing at the control electrode of the second electron device 135 has been lowered by the difference between the original potential drop across the series connected diodes 119, 120, and 121 and the potential drop across the base to emitter diode of the transistor 149.

As a result of this lowered upper potential reference level appearing at the control electrode of the second electron device 135 in response to a negative-going pulse signal from the sync pulse source 151, the potential at the control electrode of the first electron device 133 and the charge developed at the charging capacitor 107 necessary to effect a shift in conduction of the electron devices 133 and 135 is also lowered. Moreover, a shift in conduction of the electron devices 133 and 135 at a reduced potential of the control electrode of the first transistor 133 causes an increased frequency of oscillation as will be explained with respect to FIG. 5.

When the potential at the control electrode of the first electron device 133 is between the original upper potential reference level and the lowered upper potential reference level and a negative-going pulse signal applied to the base of the sync pulse transistor 149 lowers the upper potential reference level at the control electrode of the second electron device 135, there is a shift in conduction of the electron devices 133 and 135. Thus, the oscillator is considered to be triggered by the negative-going sync pulse signal applied to the control electrode of the transistor 149.

Figures 4, 5:
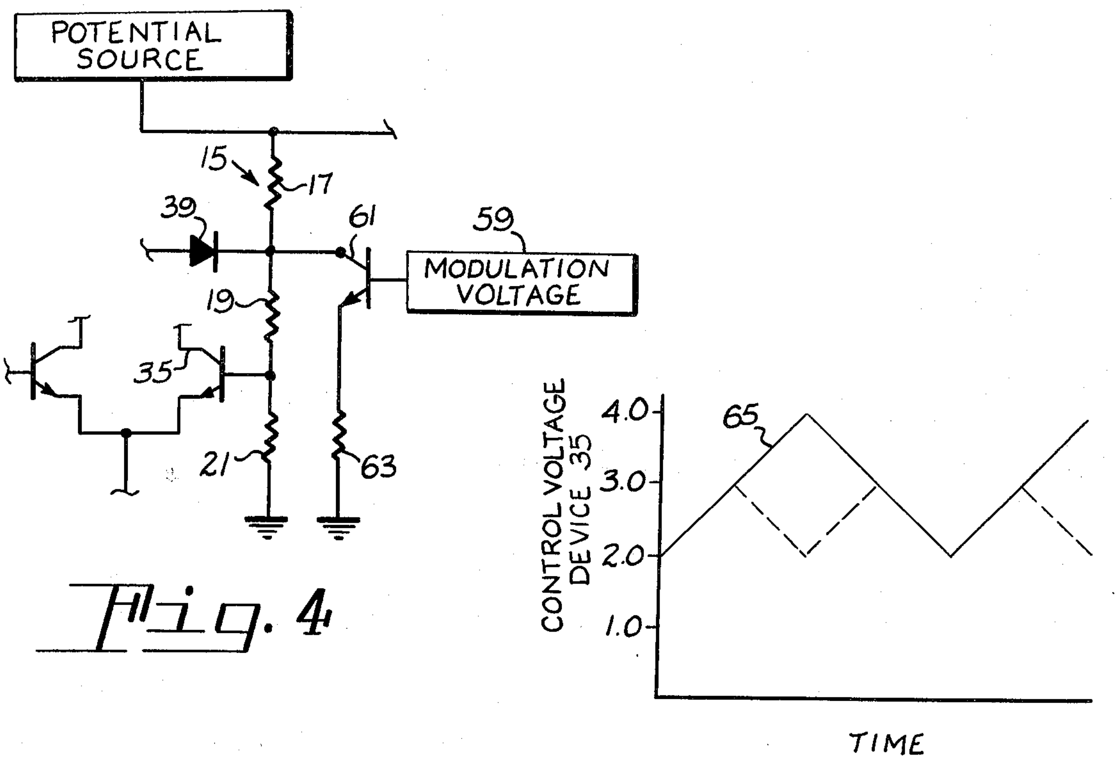
FIG. 4 is a schematic illustration of a preferred form of circuitry for effecting frequency modulation of the circuitry of FIG. 1.
FIG. 5 is a graphic illustration of the results obtainable with the frequency modulation circuitry of FIG. 4.

As to frequency modulation, FIG. 4 illustrates a modulation voltage source 59 coupled to the control electrode of an eighth electron device 61. In turn, the eighth electron device 61 is coupled by a resistor 63 to a potential reference level and directly connected to the junction of the fourth electron device or diode 39 and series connected resistors 17 and 19 of the first bias potential circuit 15 of FIG. 1.

In operation, a modulation voltage applied to the eighth electron device 61 appears as an inverted potential at the junction of the series connected resistors 17 and 19 of the first bias potential circuit 15. Assuming a positive-going potential available from the modulation voltage source 59, a negative-going potential appears at the junction of the resistors 17 and 19. Thereupon, the potential necessary to effect switching of the second electron device 35 is reduced and the frequency is consequently increased. As illustrated in FIG. 5, the frequency of the developed signal 65 is substantially doubled when the magnitude of the saw-tooth voltage across capacitor 7 is reduced by approximately one-half.

Figure 7:
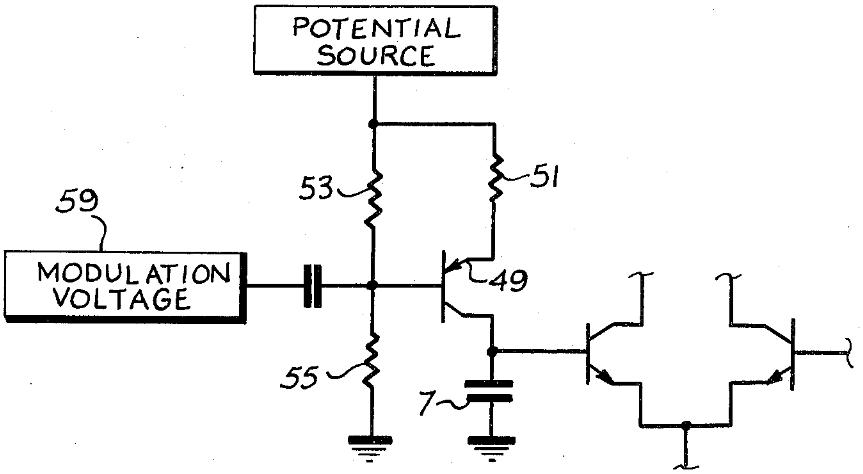
FIG. 7 is another embodiment of frequency modulation apparatus suitable to the circuitry of FIG. 1.

Alternative embodiments for effecting a frequency shift in response to a modulation voltage are illustrated in FIGS. 6 and 7. For example, the modulation voltage source 59 is applied to a ninth electron device 67 coupling the fifth and sixth electron devices 43 and 45 to circuit ground. Thus, the modulation potential is employed to control the current conduction of the sixth electron device 45 during the discharge period of the charging capacitor 7 whereupon the frequency of the signal available at the charging capacitor 7 is varied. Moreover, a modulation potential 59 of FIG. 7 applied to the control electrode of the seventh electron device, 49 of FIG. 2, modulates the current flow of electron device 49 which varies mainly the charge time of the capacitor 7.

Therefore, a unique-non-saturating oscillator and modulator circuit has been provided wherein a single charging capacitor is employed under non-saturating conditions. This non-saturating mode of operation removes the critical problems of specific portions of the charging curve suitable for operation of the electron devices. Also, the electron devices have a common base to emitter junction whereby temperature variations of the devices "track" one another. Moreover, the circuit is readily integratable with a minimum number of external terminals which greatly enhances fabrication and reduces costs.

While there has been shown and described what is at present considered the preferred embodiments of the invention, it will be obvious to those skilled in the art that various changes and modifications may be made therein without departing from the invention as defined by the appended claims.

What is claimed is:

1. A non-saturating oscillator and modulator circuit comprising:

a potential source;

a charging network means and first and second bias potential circuit means parallel coupled intermediate said potential source and a potential reference level;

a first differential amplifier means coupled to said charging network means and by an electron device to said first bias potential circuit; and a second differential amplifier means coupled to said charging network means and said first and second bias potential circuit means whereby said first differential amplifier means and said charging network means control development of the charging portion of a sawtooth-shaped potential and said charging network means and second differential amplifier means control the discharging portion of said potential.

2. The non-saturating oscillator and modulator circuit of claim 1 wherein said electron device is in the form of a diode.

3. The non-saturating oscillator and modulator circuit of claim 1 wherein said charging network means includes a capacitor coupled to a potential reference level and an integratable first and second bias potential circuit means and first and second differential amplifier means.

4. A non-saturating oscillator and modulator circuit comprising:

a potential source;

charging network means and first and second bias potential circuit means parallel coupled intermediate said potential source and a potential reference level;

first, second, third, and fourth electron devices with said first and second electron device coupled to said potential source and to said potential reference level by said third electron device, said first electron device being coupled to said charging network means and to said first bias potential circuit means by said fourth electron device with said second electron device coupled to said first bias potential circuit and said third electron device coupled to said second bias potential circuit means; and fifth and sixth electron devices coupled in common to said potential reference level with said fifth electron device coupled to said potential source and first bias potential circuit means and said sixth electron device coupled to said second bias potential circuit means and to said charging network means whereby the charge and discharge of said charging network means provides a substantially sawtooth-shaped waveform.

5. The non-saturating oscillator and modulator circuit of claim 4 wherein said fourth electron device is in the form of a diode.

6. The non-saturating oscillator and modulator circuit of claim 4 wherein said charging network means includes a first impedance and capacitor series coupling said potential source and potential reference level.

7. The non-saturating oscillator and modulator circuit of claim 4 wherein said charging network means includes a series connected electron device and capacitor in parallel connection with a second impedance intermediate said potential source and reference level whereby a substantially linear sawtooth waveform is provided at said charging network means.

8. The non-saturating oscillator and modulator circuit of claim 4 including a source of modulation potential AC coupled to said first bias potential circuit means.

9. The non-saturating oscillator circuit of claim 4 including a modulation potential source and an electron device with said electron device coupling said modulation potential source to said first bias potential circuit means.

10. The non-saturating oscillator and modulator circuit of claim 4 including a modulation potential source and a electron device with said electron device coupled to said modulation potential source and intermediate said fifth and sixth electron device and said potential reference level.

11. In a non-saturating oscillator and modulator circuit having a charging network means coupled to a potential source and to a potential reference level, an integratable circuit configuration comprising:

first and second bias potential circuit means in parallel connection with said charging network means intermediate said potential source and said potential reference level;

first, second, third, and fourth electron devices with said first and second electron device coupled to said potential source and to said potential reference level by said third electron device, said first electron device coupled to said charging network means and to said first bias potential circuit means by said fourth electron device with said second electron device coupled to said first bias potential circuit means and said third electron device coupled to said second bias potential network means; and fifth and sixth electron devices coupled in common to said potential reference level, said fifth electron device being coupled to said potential source and to said first bias potential circuit means and said sixth electron device coupled to said second bias potential circuit means and said charging network means whereby said circuit configuration includes an external connection to said potential source, potential reference level, and charging network means.

12. The integratable circuit configuration of claim 11 wherein said fourth electron device is in the form of a diode.

13. The integratable circuit configuration of claim 11 wherein said first, second, third, fourth, fifth, and sixth electron devices are in the form of transistors.

14. The integratable circuit configuration of claim 11 wherein said charging network is in the form of a series connected impedance and capacitor.

15. The integratable circuit configuration of claim 11 wherein said charging network means includes a series connected electron device and capacitor coupled to said potential source and potential reference level and a second impedance coupled to said electron device and intermediate said potential source and potential reference level.

16. The integratable circuit configuration of claim 11 including a modulation potential source and an electron device coupling said modulation potential source to said first bias potential circuit means.

17. The integratable circuit configuration of claim 15 including a modulation potential source coupled to said electron device.

18. An oscillator circuit comprising:

a potential source;

a charging network means coupling said potential source to a potential reference level;

a first bias potential circuit means coupling said potential source to a potential reference level;

a second bias potential circuit means coupling said potential source to a potential reference level;

first differential amplifier means coupled to said charging network means, said first bias potential circuit means, and intermediate said potential source and potential reference level;

second differential amplifier means coupled to said first and second potential circuit means intermediate said potential source and a potential reference level; and wherein said charging network means includes a series connected capacitor, transistor, and impedance coupled to said first differential amplifier means and intermediate said potential source and potential reference level.

19. The non-saturating oscillator and modulation circuit of claim 4 wherein said charging network means includes a pair of resistors series connected intermediate said potential source and potential reference level with a series connected resistor, electron device, and capacitor shunting said pair of series connected resistors and a modulation potential source coupled to the junction of said pair of series connected resistors and to said electron device.

20. The integratable circuit configuration of claim 11 including a modulation potential source and an electron device coupling said modulation potential source intermediate said fifth and sixth electron devices and said potential reference level.

21. An oscillator circuit comprising:

a potential source and potential reference level;

charging network means including a capacitor means coupled to said potential reference level and an integratable circuit means coupled intermediate said potential source and said capacitor;

first and second bias potential circuit means parallel coupled with said charging network means intermediate said potential source and potential reference level;

first differential amplifier means coupled to said charging network means and to said first bias potential circuit means and intermediate said potential source and said potential reference level; and second differential amplifier means coupled to said first and second bias potential circuit means and said charging network means and intermediate said potential source and potential reference level.

22. The oscillator circuit of claim 21 wherein said integratable circuit means of said charging network means includes an impedance and a transistor coupled intermediate said potential source and said capacitor.

23. The oscillator circuit of claim 21 including a potential transfer circuit coupling said first differential amplifier means to said first bias potential circuit means, said transfer circuit means including a first transistor coupled to said first differential amplifier means, said potential source, and a second transistor with said second transistor coupled to said potential reference level and via series connected diodes to said first bias potential circuit means.

24. The oscillator circuit of claim 21 including a sync pulse signal source and a sync pulse transistor means having a transistor coupled to said sync pulse signal source and via a diode to said first differential amplifier means, to said potential reference level, and to said first bias potential circuit means whereby bias potential applied to said first differential amplifier means from said first bias potential circuit means is altered in response to a signal from said sync pulse signal source.

25. The oscillator circuit of claim 21 including a sync pulse transistor means coupled to a sync pulse signal source, to said first differential amplifier means, and to said first bias potential circuit means wherein said circuit means of said charging network means, said first and second bias potential circuit means, said first and second differential amplifier means, and said sync pulse transistor means are in the form of an integrated circuit.

26. The oscillator circuit of claim 21 including a potential transfer circuit coupling said first differential amplifier means to said first bias potential circuit means and to a circuit output means and a sync pulse transistor means coupling a sync pulse signal source to said first differential amplifier means and to said first bias potential circuit means whereby a signal from said sync pulse signal source effects frequency control of said oscillator circuit.

* * * * *